United States Patent
Yao et al.

(10) Patent No.: US 8,532,013 B2
(45) Date of Patent: Sep. 10, 2013

(54) METHOD AND APPARATUS IN A PLURALITY OF RENDEZVOUS POINTS FOR TOGETHER PROCESSING MULTICAST TRAFFICS FROM MOBILE MULTICAST SOURCE

(75) Inventors: Chunyan Yao, Shanghai (CN); Hongbin Yu, Shanghai (CN); Jianbin Chen, Shanghai (CN); Shuigen Yang, Shanghai (CN); Jun Zheng, Shanghai (CN); Fanxiang Bin, Shanghai (CN)

(73) Assignee: Alcatel Lucent, Paris (FR)

( * ) Notice: Subject to any disclaimer, the term of this patent is extended or adjusted under 35 U.S.C. 154(b) by 99 days.

(21) Appl. No.: 13/375,130

(22) PCT Filed: Jun. 3, 2009

(86) PCT No.: PCT/CN2009/072116
§ 371 (c)(1),
(2), (4) Date: Nov. 29, 2011

(87) PCT Pub. No.: WO2010/139115
PCT Pub. Date: Dec. 9, 2010

(65) Prior Publication Data
US 2012/0076067 A1    Mar. 29, 2012

(51) Int. Cl.
*H04H 20/71* (2008.01)
*H04L 12/28* (2006.01)
(52) U.S. Cl.
USPC .......................................... 370/312; 370/390
(58) Field of Classification Search
USPC .......................................... 370/312, 389, 390
See application file for complete search history.

(56) References Cited

U.S. PATENT DOCUMENTS
2007/0211730 A1* 9/2007 Cuthbert et al. ......... 370/395.53

FOREIGN PATENT DOCUMENTS
CN    101035057 A    9/2007
CN    101159573 A    4/2008

OTHER PUBLICATIONS

International Search Report.
Romdhani et al., "Transparent Handover for Mobile Multicast Sources", Proceedings of the ICNICONSMCL. Dec. 31, 2006, pp. 1-7.
Search Report for European Application No. 09845396.2 dated Feb. 21, 2013.

(Continued)

*Primary Examiner* — Ronald Abelson
(74) *Attorney, Agent, or Firm* — Harness, Dickey & Pierce

(57) ABSTRACT

The invention proposes method and apparatus in a plurality of rendezvous points for together processing multicast traffics from mobile multicast source. Wherein, a first rendezvous point and at least one second rendezvous point compose an anycast group which is used for sharing the processing task of the multicast data packets of the mobile multicast source point together, the first rendezvous point and the at least one second rendezvous point share a route forwarding table, the route forwarding table comprises corresponding relation among the care-of-address, the home address and the multicast address of one or more multicast sources. The first rendezvous point obtains the multicast data packets, forwards the multicast data packets to the at least one second rendezvous point, when needing to forward the multicast data packets to the at least one second rendezvous point; the first rendezvous point searches the route forwarding table, according to address information of the multicast packet; determines the corresponding shared multicast tree, when the address information matches the care-of address and/or home address and matches the multicast address of an candidate multicast source; and forwards the multicast data packet according to the shared multicast tree.

14 Claims, 5 Drawing Sheets

(56) References Cited

OTHER PUBLICATIONS

D. Farinacci, Y. Cai, Cisco Systems, "Anycast-RP Using Protocol Independent Multicast (PIM); rfc4610.txt," Aug. 1, 2006, XP015047374, pp. 1-12.

Thomas C. Schmidt et al., "Multicast Mobility in MIPv6: Problem Statement and Brief Survey; draft-irtf-mobopts-mmcastv6-ps-07. txt," Multicast Mobility in MIPV6: Problem Statement and Brief Survey; Draft-IRTF-MOBOPTS-MMCASTV6-PS-07.txt, Internet Engineering Task Force, ISTF; Standard Working Draft, Internet Society (ISOC) 4, Rue Des Falaises Ch-1205, Geneva, Switzerland, No. 7, Apr. 13, 2009, XP015062091.

* cited by examiner

US 8,532,013 B2

METHOD AND APPARATUS IN A PLURALITY OF RENDEZVOUS POINTS FOR TOGETHER PROCESSING MULTICAST TRAFFICS FROM MOBILE MULTICAST SOURCE

TECHNICAL FIELD

The invention relates to the communication networks, particularly relates to the rendezvous point of the communication networks, used for processing multicast data packets from the mobile multicast source.

BACKGROUND OF THE ARTS

In recent years, more and more subscribers access Internet via mobile terminals. The users' mobile terminals include mobile phones, notebook computers, personal digital assistants, and so on. The booming mobile internet makes mobility an important element in group communication. Group communication includes a variety of applications, such as: content broadcasting and streaming, voice and video conferencing, massive multiplayer gaming, even the distributed systems, traffics or self-organization of autonomous networks. Any Source Multicast (ASM) is very suitable for many-to-many communication. In Mobile Internet, the mobility of multicast source can be is unavoidable.

Existing solutions for the mobility of multicast source can be sorted in three categories:

Statically Rooted Distribution Trees

Romdhani, I. and others proposed using rendezvous point (RP) solving the mobility problem of multicast source in "Transparent handover for mobile multicast source" published in 'Proceedings of the IEEE ICN' 06. We call the point as "Mobility-aware Rendezvous Points (MRP)". The basic idea of the solution is: When a mobile point, which is also a mobile source, moves into a foreign network, the mobile point gets a Care-of-Address (CoA). Before the mobile multicast source sends data to a multicast group, the mobile multicast source has to register to the MRP the binding between its CoA and Home Address (HoA) of the mobile multicast source, as well as other related information, such as: Security Association, and CoA's lifetime etc. Therefore, MRP can know that the CoA identified source is the same multicast source as the HoA identified source, but just moved. Thus when the multicast data package, using CoA as the source IP address, appears, MRP can identify that the data packet is actually sourced from the formerly source identified by HoA. Hence, MRP modifies the source IP of the arrived multicast data package to HoA, and sends the multicast data package following the shared multicast tree which uses MRP as the root point. By this way, the CoA is transparent to members of group multicast group, that is transparent to the receivers of the multicast content, hence avoiding the re-construction of shared multicast tree.

Reconstruction of Distribution Trees

Several authors proposed to construct a completely new distribution tree after the movement of a multicast source, thereby having to compensate the routing delays. In Schmidt, T. C. and Waehlisch, M's "Seamless Multicast Handover in a Hierarchical Mobile IPv6 Environment" and the "Scalable Multicast Protocol in IP-Based Mobile Networks" published by Lin, C. R. and others in Wireless Networks and Applications, 2000, page 259-271, both have involved the above solution.

Tree Modification Schemes

Chang, R.-S. and Yen, Y.-S. proposed in "A Multicast Routing Protocol with Dynamic Tree Adjustment for Mobile IPv6", in the Distance Vector Multicast Routing Protocol (DVMRP) solution, using Reverse Traffic Interface (RTI), establishing a Backward-Forced Path (BFP) between the new "multicast tree root point" and the original "multicast tree root point", in order to save the integrity of the original multicast trees, at the same time of avoiding the rebuilding of the multicast trees, still allowing all the recipients to continue to receive the multicast stream. In the same domain, using the way of shared multicast trees can greatly reduce the mobility related complexity. In above three implementing solutions: compared to the other two ways, statically rooted MRP method needs the least change to the existing multicast routing protocol, such as the PIM-SM protocol, and it can work conveniently with PIM-SM (Protocol Independent Multicast-Sparse Mode) and MSDP (Multicast Source Discovery Protocol). Hence, compared to other two solutions, the statically rooted shared trees solution is more easy to be implemented and deployed. Therefore, it can be determined that the solution is the most advantageous implementing way of ASM with multicast source mobility solutions by now.

SUMMARY OF THE INVENTION

Since the existing technology has the above problems, the invention proposes that one rendezvous Point is expended to an anycast group formed by several rendezvous points, the anycast group is shown as a logical entity to the external, and commonly shares the downwards forwarding of the multicast data packages of the mobile multicast source points.

According to the first aspect of present invention, it is provided A method, used for processing multicast data packets from mobile multicast source point, in a first rendezvous point of communication network, wherein, the first rendezvous point and at least one second rendezvous point compose an anycast group which is used for sharing the processing task of the multicast data packets of the mobile multicast source point together, the first rendezvous point and the at least one second rendezvous point share a route forwarding table, the route forwarding table comprise corresponding relation among the care-of-address, the home address and the multicast address of one or more multicast sources, the method comprises the following steps: a. obtaining the multicast data packets; b. forwarding the multicast data packets to the at least one second rendezvous point, when needing to forward the multicast data packets to the at least one second rendezvous point; and after the step a the method further comprises: m. searching the route forwarding table, according to address information of the multicast packet; n. determining the corresponding shared multicast tree, when the address information matches the care-of address and/or home address and matches the multicast address of an candidate multicast source in the one or more multicast sources, and forwarding the multicast data packet according to the shared multicast tree.

According the second aspect of present invention, providing a processing device, used for processing the multicast data packets from mobile multicast source point, in the first rendezvous point of communication network, wherein, the first rendezvous point and at least one second rendezvous point compose an anycast group which is used for sharing the processing task of the multicast data packets of the mobile multicast source point together, the first rendezvous point and the at least one second rendezvous point share a route forwarding table, the route forwarding table comprise corresponding relation among care-of-address, the home address and the multicast address of one or more multicast sources, the device comprising: an obtaining means, used for getting the multicast data packet; a sending means, used for forwarding the multicast data packet to the at least one second rendezvous point, when need to forward the multicast data packet to the at least one second rendezvous point. a searching means, used for searching the route forwarding table, according to the address information of the multicast packet; a determining means, used for determining the corresponding shared multicast tree, when the address information matches the care-of address and/or home address and matches multicast address of a candidate multicast source in one or more multicast sources, and forwarding the multicast data packet according to the shared multicast tree.

Using the solution of the present invention, it is able to achieve the load-sharing among RPs and the automatic fault recovery of RP function, avoiding the single-point failure of single RP, improving the usability of multicast system, and improving the user traffic experience.

BRIEF DESCRIPTION OF THE DRAWINGS

Other features, objective and advantage of the invention will become obvious by reading the detailed description to the non-limiting embodiments with reference to the following drawings.

Wherein, the same or similar marked figures present the same or similar procedure characteristics or devices/modules.

DETAILED EMBODIMENT OF THE INVENTION

The following will elucidate each non-restrictive embodiment of the present invention, with reference to the figures.

Figure 1:
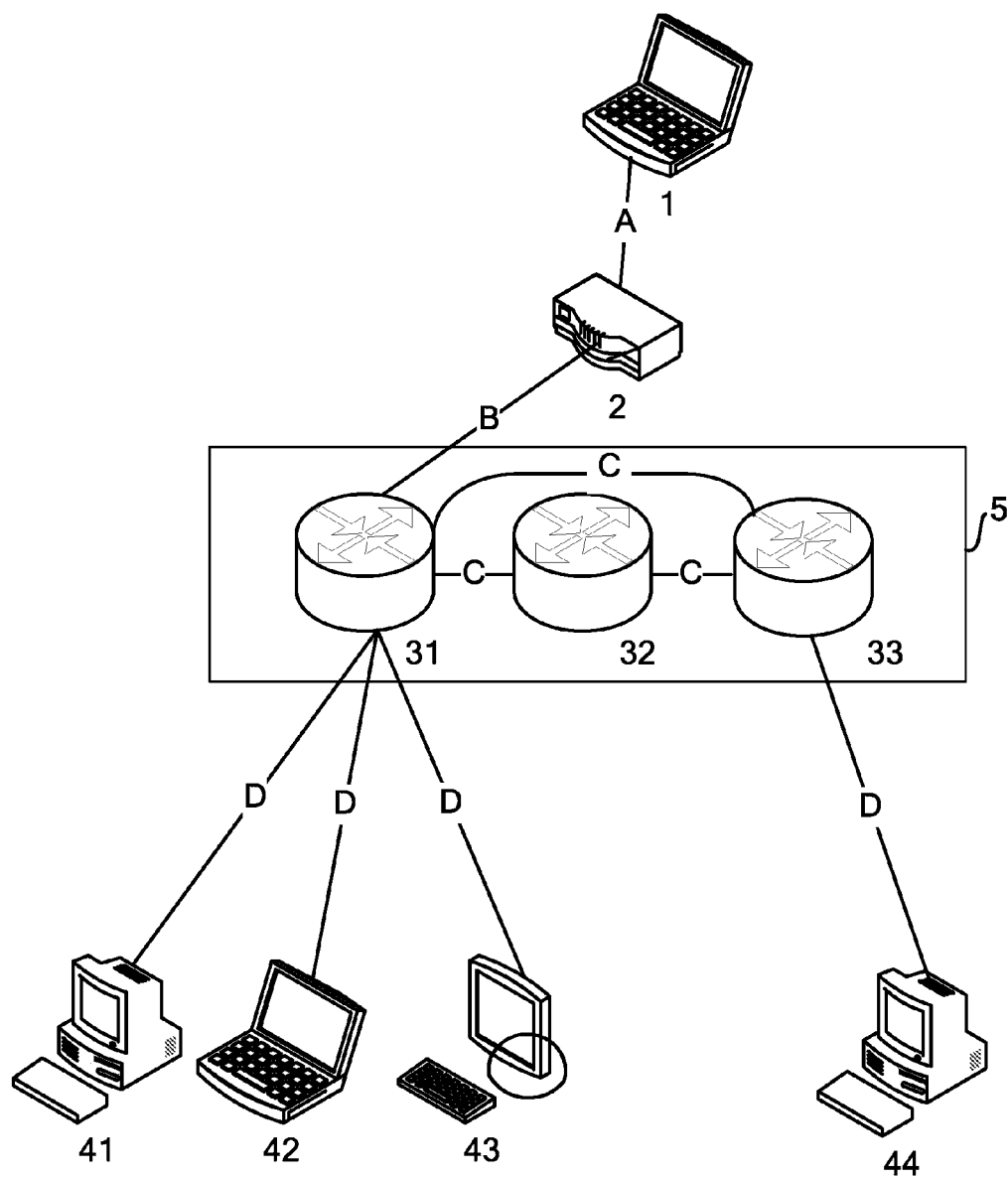
FIG. 1 is the IP network topology structure diagram based on ASM, according to an embodiment of the invention.

FIG. 1 is a diagram of the IP network based on ASM, and it should be understood that for simplicity, it only shows the segments related to the invention, and the omitted part can be implemented by those skilled in the art by combining the existing or the future technology in this art, such omission do not affect the sufficient disclosure of the invention. In addition, as those skilled in the art understand, the number of each network equipment shown in the figures is just to meet the needs of the following description, and it does not constitute any restriction to this invention. Shown in FIG. 1, mobile multicast source point 1, such as a notebook computer, accesses the IP network through the equipments such as MODEM of family network. FIG. 1 also shows a router 2 based on multicast routing protocols such as PIM-SM or BIDIR-PIM, it is in advance selected as the CDR (Currently Designated Router) of one or more multicast sources (including mobile multicast source point) in the current subnet, the following will refer it to the current designated router 2 for short. The current designated router 2 can be placed in the ER (Edge Router). FIG. 1 also includes the RP 31, 32 and 33. These three RPs 31, 32 and 33 can be placed in the ER, or can be placed in the CR (Core Router). These three RP compose an anycast group 5, commonly takes the processing tasks of RPs of the shared multicast tree, and shares the address of one anycast group 5. In addition, three RPs 31, 32 and 33 have different IP unicast addresses respectively, used for the communication between them.

In FIG. 1, line A represents the connection between mobile multicast source point 1 and designated router 2, line B represents the traffic data or signal from mobile multicast source point 1 is routed to one RP of RP anycast group 5 by the way of anycasting. According to the routing strategy, preferably, traffic data or signal from mobile multicast source point 1 are routed to the nearest RP, such as RP 31. Those skilled in the art are able to understand, other traffic data or signal from different mobile multicast source point or from current designated router 2 also can reach other RP of that anycast group 5, such as RP 32 or 33, according to the anycast routing strategy. The connections between RP 32, 33 and the designated router are not shown in the figures, just for easy illustrating, rather than limiting the connection between RP 32, 33 and the designated routers. Line C represents that the members of RP anycast group 5 are all inter-connected. Line D respectively represents that the RP 31 is connected with hosts 41, 42 and 43, and RP 32 is connected with host 44. Wherein, host 41, 42, 43 and 44 all join to the same multicast group. Those skilled in the art are able to understand, the mentioned connections represented by lines A, B, C and D may be implemented by wire, wireless link and network devices such as routers. In FIG. 1, the connection details is omitted by using the lines, eg, the possible multihop router equipment and switching equipment and etc. that may contained in the connection represented by line D are omitted, and such omitting show do not affect the sufficient disclosure of the present invention. Wherein, connection represented byline D usually contains the router equipment which has the same usage with designated router 2.

In order to implement load sharing and prevent single-point failure, in the solution of the present invention based on ASM, several RPs constitute the anycast group 5 used for sharing the processing task of multicast traffic for the mobile multicast sources. Shown in FIG. 1, RP 31 is the root point of hosts 41, 42 and 43, and RP 33 is the root point of host 44. That is, each RP manages parts of multicast members in the multicast group, all the RPs of anycast group 5 are taken as an entirety, and manages all the multicast members of the multicast group. RP 31, 32 and 33 belong to the same anycast group 5, sharing the address of anycast group 5. Wherein, RP 31, 32 and 33 share the route forwarding table, which contains one or more corresponding relations of CoA, HoA and multicast address of the mobile multicast source. In addition, the route forwarding table can also contain security association of the CoA, life-time of the CoA etc.

Figure 2:
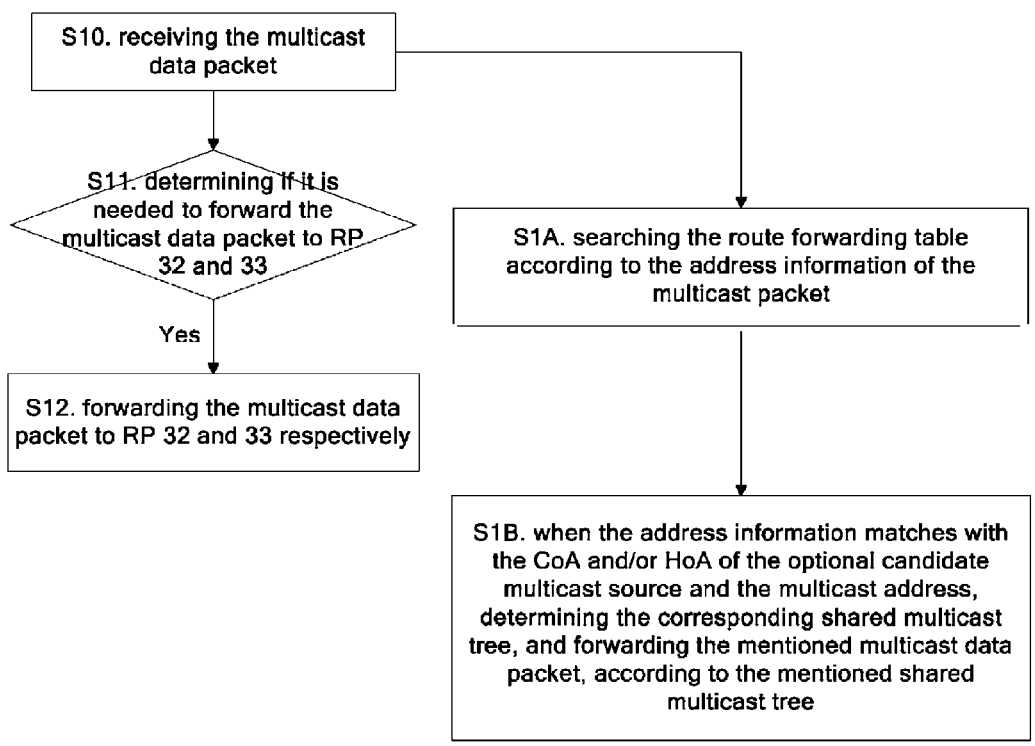
FIG. 2 is the flow chart of the method, according to an embodiment of the invention.

Firstly, referring to FIG. 2, taking RP 31 as an example, primarily for the multicast data packets, specific descriptions of the present invention are set forth as the following:

Firstly, in step S10, RP 31 receives the multicast data packets, the multicast data packets comprise the following several sending mode:

I) the multicast data packet only contains one layer of IP header The multicast data packet only has one layer of IP header, namely it is native multicast data packet, and the IP packet is directly sent by CDR 2 to RP 31. The source IP address in the IP header is the CoA or the HoA of mobile multicast source point 1, wherein, the source address is CoA is corresponding to the case of multicast source point 1 has movement; the source address is HoA is corresponding to the case of multicast source point 1 has no movement, the destination address is the multicast address G, shown as FIG. 3.

Figure 4:
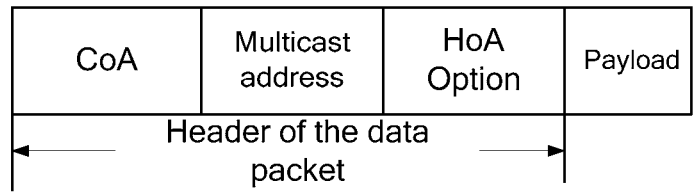
FIG. 4 is the diagram of one varied embodiment of the encapsulation format of multicast data packets shown in FIG. 2.

In a varied embodiment, shown as FIG. 4, in the case of the source address of the header of the multicast data packet is CoA, the address information of the IP header of the native multicast data packet also contains the HoA option. Eg, using the way of extension header or extension options in the IP header, regulated by the TLV (Type, Length, Value) way, the content of extended header or extended options is the HoA.

II) the multicast data packet contains two layers of IP header when the multicast data packet contains two layers of IP header, according to different sending strategy, the source address, destination address of each layer of the multicast data packet header may has the following several scenario:

II-a) multicast data packet sent in unicast tunnel mode, which takes the CoA of mobile multicast source point 1 as the source address, and takes the anycast address of the anycast group 5 composed by RPs as the destination address.

Figure 5A:
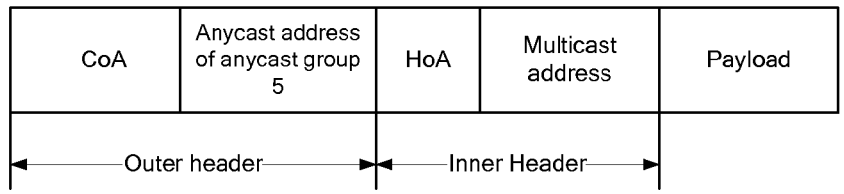
FIGS. 5A-5C are the diagrams of encapsulation format of multicast data packets according to another embodiment of the invention respectively.

Shown as FIG. 5A, the source IP address of the outer layer IP header (that is, outer tunnel header) is the CoA of mobile multicast source point 1, and the destination IP address of the outer layer IP header (that is, outer tunnel header) is the anycast address of the anycast group 5 composed by RPs. The source IP address of the inner IP header is the HoA of the mobile multicast source point 1, and the destination IP address is the multicast address G.

II-b) multicast data packet sent in unicast tunnel mode, which takes the unicast address of the designated router 2 as the source address, and takes the anycast address of the anycast group 5 composed by RPs as the destination address.

Figure 5B:
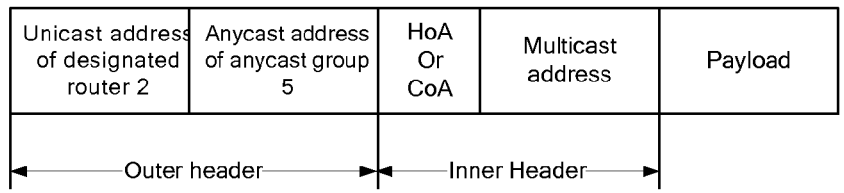

Shown as FIG. 5B, the source IP address of the outer layer IP header (that is, outer tunnel header) is unicast address of designated router 2, and the destination IP address of the outer layer IP header (that is, outer tunnel header) is the anycast address of the anycast group 5 composed by RPs. The source IP address of the inner IP header is the HoA or CoA of the mobile multicast source point 1, and the destination IP address is the multicast address G.

Figure 6A:
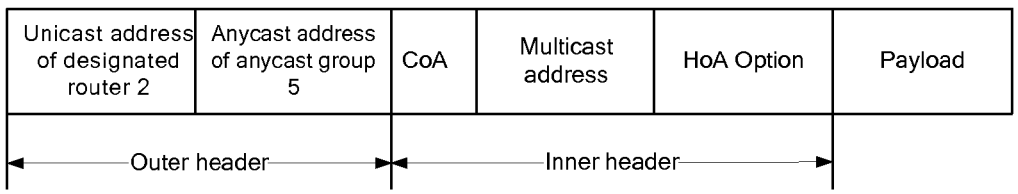
FIG. 6A corresponds to a diagram of one varied embodiment of the encapsulation format of multicast data packets in FIG. 5B.

In a varied embodiment, shown as FIG. 6A, in the case of the source address of the inner header of the multicast data packet is CoA, the address information of the IP header of the native multicast data packet also contains the HoA option. Eg, using the way of extension header or extension options in the IP header, regulated by the TLV (Type, Length, Value) way, the content of extended header or extended options is the HoA.

II-c) multicast data packet sent in the unicast tunnel mode from RP 32 or 33

Figure 5C:
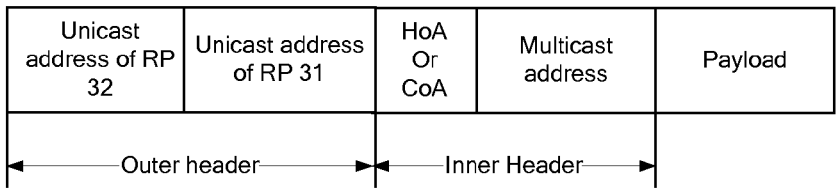

Shown as FIG. 5C, the source IP address of the outer layer IP header (that is, outer tunnel header) is unicast address of RP 32 or 33, FIG. 5C shows the unicast address of RP 32, the destination IP address of the outer layer IP header (that is, outer tunnel header) is the unicast address of RP 31. The source IP address of the inner IP header is the HoA or CoA of mobile multicast source point 1, and the destination IP address is the multicast address G.

III) multicast data packet contains three layers of IP header when the multicast data packet contains three layers of IP header, according to different sending strategy, the source address, destination address of each layer of the multicast data packet header may has the following several scenario:

III-a) multicast data packet sent in unicast tunnel, which takes the CoA of mobile multicast source point 1 as the source address, and takes the anycast address of the anycast group 5 composed by RPs as the destination address.

Figure 7A:
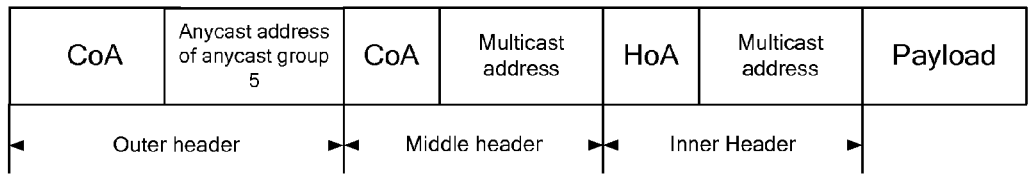
FIGS. 7A-7C are the diagrams of encapsulation format of multicast data packets according to another embodiment of the invention.

Shown as FIG. 7A, the source IP address of the outermost layer IP header is the CoA of mobile multicast source point 1, and the destination IP address of the outermost layer IP header is the anycast address of the anycast group 5 composed by RPs. The source IP address of the middle layer IP header is the CoA of mobile multicast source point 1, and the destination IP address of the middle layer IP header is the anycast address G. The source IP address of the innermost layer IP header is the HoA of mobile multicast source point 1, the destination address is the multicast address G.

III-b) multicast data packet sent in unicast tunnel mode, which takes the unicast address of the designated router 2 as the source address, and takes the anycast address of the anycast group 5 composed by RPs as the destination address.

Figure 7B:
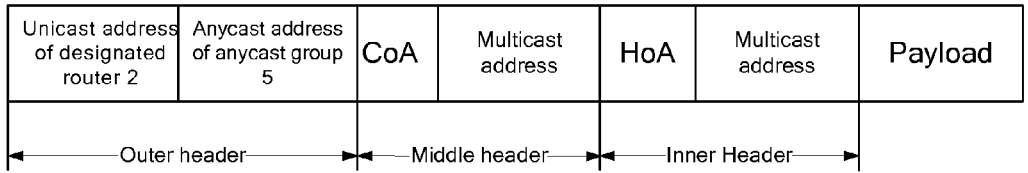

Shown as FIG. 7B, the source IP address of the outermost layer IP header is the unicast address of designated router 2, and the destination IP address of the outermost layer IP header is the anycast address of the anycast group 5 composed by RPs. The source IP address of the middle layer IP header is the CoA of the mobile multicast source point 1, and the destination IP address of the middle layer IP header is the multicast address G. The source IP address of the innermost layer IP header is the HoA of mobile multicast source point 1, and the destination address is the multicast address G.

III-c) multicast data packet sent in the unicast tunnel mode from RP 32 or 33.

Figure 7C:
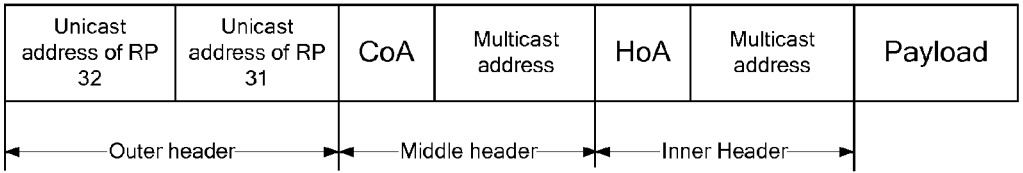

Shown as FIG. 7C, the source IP address of the outermost layer IP header is the unicast address of RP 32 or 33, and the destination IP address of the outermost layer IP header is the unicast address of RP 31. The source IP address of the middle layer IP header is the CoA of the mobile multicast source point 1, and the destination IP address of the middle layer IP header is the multicast address G. The source IP address of the innermost layer IP header is the HoA of mobile multicast source point 1, and the destination address is the multicast address G.

Then, the method enters step S11. In step S11, RP 31 determines whether it is needed to send the multicast data packets to RP 32 and 33. In the present embodiment, we name the RP 31 that received the multicast data packet as the first RP, the sending object RP to which the first RP may forward the multicast data packet as the second RP 32 and 33. It should be understood that, such division is just for easy illustration. Actually, any RP can both send multicast data packet to other RP in the same anycast group 5, and receive the multicast data packets sent by other RP in the same anycast group 5. Therefore, one RP can act both as the first RP, and as the second RP.

In one embodiment, RP 31 pre-stores the unicast address of all other RPs of anycast group 5, in the present embodiment, comprising the unicast addresses of RP 32 and 33.

RP 31 determines if the source IP address of the outermost layer IP header of present multicast data packet contains the unicast address of RP 32 or 33, according to the obtained multicast data packet. It should be noted that, when the multicast data packet only contains one layer of IP header, the outermost layer IP header is the only one layer of IP header. If the source IP address of the outermost IP header of present multicast data packet contains neither the unicast address of RP 32, nor the unicast address of RP 33, then RP 31 determines the need to forward the multicast data packet to other RP in anycast group 5.

Then, the method enters step S12. In step S12, RP31 directly sends the multicast data packet to RP32 and 33 respectively. RP can send the multicast data packet to all the other RPs in anycast group 5, by using the way of unicast tunnel, or adding the routing extension header (mainly for IPv6) or by source routing options (mainly for IPv4) in data packets.

Specifically, when the data packet received by RP31 is corresponding to case I) multicast data packet only contains one layer of IP header, RP 31 directly packages a layer of IP header out of the outermost layer of the multicast data packet, that is, adding one layer of header. The source address of the new-added header is the unicast address of RP31, the destination address of the new-added header is respectively the unicast address of the second RP which needs to receive the anycast data packet sent from RP31 in unicast group 5. Eg, in step S12, RP31 respectively sends multicast data packet to RP32, 33 by the way of unicast tunnel, the source address of the outermost layer tunnel header of the multicast data packet is the unicast address of RP31, and the destination address of the outermost layer tunnel header is the unicast address of RP32 and 33 respectively.

When the data packet received by RP31 is corresponding to the multicast data packet in case II-a) and III-a) which uses the CoA of the mobile multicast source point 1 as the source address, and uses the anycast address of anycast group 5 composed by RPs as the destination address, sent in the way of unicast tunnel, and having two layers or three layers of headers, RP31 replaces the source address of the outermost layer data header from the CoA of the mobile multicast source point 1 to the unicast address of the first RP31, and replaces the destination address of the outermost layer IP header from the anycast address of the anycast group 5 composed by RPs to the unicast address of the second RP32 or 33, and send them to all the other members of anycast group 5 by the way of unicast. Optionally, for case II-a), RP31 can package a unicast tunnel header out of the outer layer data header directly, and this unicast tunnel header has the unicast address of the first RP31 as the source address, and unicast address of the second RP32 or 33 as the destination address.

When the data packet received by RP31 is corresponding to the multicast data packet in case II-b) and III-b) which uses the unicast address of designated router 2 as the source address, and uses the anycast address of anycast group 5 composed by RPs as the destination address, sent in the way of unicast tunnel, and having two or three layers of headers, RP31 replaces the source address of the outermost layer data header from the unicast address of the designated router to the unicast address of the first RP31, and replaces the destination address of the outermost layer IP header from the anycast address of the anycast group 5 composed by RPs to the unicast address of the second RP32 or 33, and sends it to all the other members of anycast group 5 by the way of unicast. It is worth noting that, when the data packet received by RP31 is corresponding to the multicast data packet in case II-c) and III-c) which is from RP32 or 33, sent in the way of unicast tunnel, and having two layers or three layers of headers, RP31 does not forward the multicast data packet to any member of the unicast group 5.

After step S10 the method further comprises the following steps: S1A, RP31 searches the route forwarding table, according to the address information of multicast packet; S1B, when the address information matches with the CoA and/or HoA of the candidate multicast source and the multicast address, determines the corresponding shared multicast tree, and forwards the mentioned multicast data packet, according to the mentioned shared multicast tree.

RP31, 32 and 33 share the route forwarding table, and the route forwarding Table is shown as table 1. Wherein, Table 1 shows the source address, CoA, and out-interface. It is worth noting that, the out-interface information stored in the each route forwarding table of RP31, 32 and 33 is maintained respectively by each RP, according to the Join information from the members of the multicast group, therefore, the out-interface information of the multicast group corresponding to the same multicast source are different at the route forwarding table of different RP. In addition, the route forwarding table can also comprises the life period of the CoA, registration security levels, since it has little relationship with present invention, therefore, for easy illustration, they are not shown in Table 1.

TABLE 1

| HoA | CoA | G | Out-Interface List | ... |
|---|---|---|---|---|
| HoA1 | CoA1 | G1 | I1, I2, I3 | ... |
| HoA2 | CoA2 | G2 | N/A | ... |
| HoA3 | CoA3 | G3 | I4, I5 | ... |
| HoA4 | CoA4 | G1 | I1, I2, I3 | ... |
| ... | ... | ... | ... | ... |

The following describes step S1A and S1B, still following the three sending scenarios of data packet mentioned in step S10.

I) multicast data packet contains only one layer of IP header

Two Times Searching (at most)

The multicast data packet has only one layer of IP header. The address information contains the source address and destination address of the IP header. In step S1A, RP31 searches for the HoA and multicast address pair in the route forwarding table, according to the source address and destination address of the IP header, that is, determines whether the source address and destination address of the IP header respectively matches the HoA and multicast address of one candidate multicast source point, that is, the HoA and multicast address in the same line. When the source address of the IP header of the multicast data packet matches the HoA of one candidate multicast source point in the route forwarding table, eg, HoA1, and the destination address of the IP header of the multicast data packet matches the Group address of the candidate multicast source point in the route forwarding table, eg, G1, that is, the source address and destination address of the IP header of the multicast data packet match the HoA and Group address (belong to the same line) of one candidate multicast source point in the route forwarding table. The following, for easy illustration, we use this expression way: <source address of the header, destination address of the header> matches <HoA1, G1>, to express the respective corresponding relationship that the source address of the header is same to HoA1, and the destination address of the header is same to G1, that is, the order can be reversed within the angle brackets, but guarantee the address in the same location in two angle brackets is corresponding, similarly hereinafter. At this point, the RP31 determines that the multicast source does not move. In step S1B, RP31 determines the shared multicast tree G1 which uses the HoA1 as the source and corresponding to the candidate multicast source point as the shared multicast tree for down-forwarding the multicast data packet, and forwarding the multicast data packet according to the shared multicast tree. For example, shown as Table 1, RP31 down-forwards the multicast data packet following the out-interface I1, I2, and I3 that are corresponding to <HoA1, G1>. The source IP address of the multicast data packet sent by RP31 from out-interface I1, I2 and I3 is HoA1, and destination IP address is G1.

It is worth noting that, it can be seen in table 1, group address G1 can both corresponds to HoA1, and also to HoA4. In ASM, HoA and G are not limited by the one to one relationship, and it can be many to one, and also can be one to many.

In a varied embodiment, the address information in the IP header of the native multicast data packet further contains HoA option. Step S1B further comprise removing the HoA option, only keeping the HoA1 as the source IP address and G1 as the destination address, and down-forwarding the multicast data packet following the corresponding out-interface.

In a varied embodiment, in Step S1A, when the RP31 searches the <HoA, G> of each candidate multicast source point in the route table, according <source address, destination address>, and has not found the HoA and group address pair which matches the source address and destination address of the IP header, RP31 respectively searches the CoA and multicast address of the route forwarding table that is <CoA, G> of the route forwarding table, according to the source address and destination address of the IP header, that is, determines if the source address and destination address in the IP header respectively matches the CoA and multicast address in the same line. When the source address of the IP header of the multicast data packet matches the CoA of one candidate multicast source in the route forwarding table, eg, CoA1, and the destination address of the IP header of the multicast data packet matches the Group address of the candidate multicast source point in the route forwarding table, eg, G1, the RP31 determines that the multicast source has moved. In order to keep the transparency to each point on the shared multicast tree, that is, hoping that each point on the shared multicast tree can not detect that multicast source point has moved, then in step S1B0 (not shown in figures), RP31 modifies the source address of the multicast data packet to HoA1 corresponding to CoA1, the destination address still remain as G1, unchanged. Then, step S1B1 (not shown in figures) forwards the multicast data packet according to the shared multicast tree by using HoA1 as the source, and G1 as the group address. For example, shown as Table 1, RP31 down-forwards the data packet following the out-interface I1, I2 and I3, corresponding to <HoA1, G1>. The source IP address of the multicast data packet sent by RP31 from out-interface I1, I2 and I3 is HoA1, and destination IP address is G1.

Of course, those skilled in the art can understand, there is no obvious order relations between RP31 searching the <HoA, G> and searching <CoA, G>, and it only depends on system configuration. If both of these two searching do not match, RP 31 considers the multicast data packet is an illegal packet, and drops it, that is, neither down-forwarding nor forwarding to other RPs. In addition, RP31 records error information in the log, and rate-limited log the error, it should not be too frequent. Too frequently recording can cause the size of the log file growing rapidly, not only taking up storage space, also wasting CPU resources, so it is needed to ensure that the amount of storage brought by recording log errors would not be increased rapidly because of the increasing of recording frequency.

One Time Searching

In another varied embodiment, the address information of the IP header of the native multicast data packet also contains the HoA option. Step S1A further comprises determining if <source address of multicast data packet header, HoA option of the extension header or extension option, destination address of the multicast data packet header> matches the <CoA, HoA, G> of the same candidate multicast source point in the route forwarding table. If the match is successful, step S1B further comprises that RP31 removes the HoA option, using HoA1 as the source IP address, G1 as the destination IP address, and down-forwarding the multicast data packet following the corresponding out-interface. And the source address of the multicast data packet sent following the out-interface is HoA1, destination address is G1, and it does not contain any HoA option.

II) Multicast data packet contains two layers of IP header

Those skilled in the art should understand, at the time of network deployment and network planning, the system identifies the consistent multicast data packet sending policy used by each network point.

For example, at the time of network planning, network administrator deploys the following policy: before establishing the routing connection between the designated router and each RP, unicast tunnel between the source to each RP is used to send the multicast data packet, that is, corresponding to the mentioned case II-a). Then, when the destination address of the outermost layer data header that RP31 received is the anycast address of the anycast group 5 composed by the RPs, and the source address of the outermost data packet header does not contain the unicast address of other RPs of anycast 5, address information contains the source address of the outer layer header, source address of the inner layer header, and destination address of inner layer header. RP31 determines whether <source address of the outer layer header, source address of the inner layer header, destination address of inner layer header> matches the <CoA, HoA, G> of the same candidate multicast source point in the route forwarding table, that is, performing a match described before. If the match is successful, eg, the source address of the outer layer header, source address of the inner layer header, destination address of inner layer header respectively matches the CoA3, HoA3 and G3 in the same line of the route forwarding table, then step S1B further comprises that, RP31 removes the outer layer data header, using HoA3 as the source IP address, and G3 as the destination IP address, and down-forwarding the multicast data packet following the corresponding out-interface I4 and I5.

Another example is, at the time of network planning, network administrator deploys the following policy, before establishing the routing connection between the designated router 2 and each RP, unicast tunnel between the unicast address of designated router 2 and anycast address of the anycast group 5 composed by RPs is used to send the multicast data packet, that is, corresponding to the mentioned case II-b). Then, when the source address of the outermost layer data header that RP31 received is the anycast address of the designated router 2, and the source address of the outermost data packet header does not contain the unicast address of other RPs of anycast 5, RP31 determines that the address information contains the source address of the inner layer header, and destination address of inner layer header. RP31 performs twice matchings, that is, determining if <source address of the inner layer header, destination address of inner layer header> matches the <CoA, G> of the same candidate multicast source point in the route forwarding table, or determining if <source address of the inner layer header, destination address of inner layer header> matches the <HoA, G> of the same candidate multicast source point in the route forwarding table. If the match is successful, eg, the source address of the inner layer header, destination address of inner layer header respectively matches the HoA3 and G3 in the same line of the route forwarding table, then step S1B further comprises, RP31 removes the outer layer header, directly using HoA3 as the source IP address, G3 as the destination IP address, and down-forwards the multicast data packet following the corresponding out-interface I4 and I5. In another case, the source address of the inner layer header and destination address of inner layer header respectively matches the CoA3 and G3 in the same line of the route forwarding table, then step S1B further comprises, RP31 removes the outer layer header, and replaces the source address of the inner layer header from CoA3 to the corresponding HoA3 as the source IP address, takes G3 as the destination IP address, and down-forwards the multicast data packet following the corresponding out-interface I4 and I5.

In a varied embodiment which uses the way of unicast tunnel between the unicast address of designated router 2 and anycast address of the anycast group 5 composed by RPs to send the multicast data packet, the inner header of the multicast data packet also contains HoA extension option, when the multicast data packet contains HoA option, RP31 directly performs a match by using <source address of inner layer header, HoA option, destination address of inner layer header> and <CoA, HoA, G> of the same multicast source point in the route forwarding table. If the match is successful, then step S1B further comprises, RP31 removes the outer layer header, and removes the HoA option of the header, replaces the CoA of the inner layer header with the corresponding HoA as the source IP address, G as the destination IP address, and down-forwards the multicast data packet following the corresponding out-interface. For case II-c), when the destination address of the outermost layer data header received by RP31 is the unicast address of RP31, the source address of the outermost layer data header contains the unicast address of RP32 or 33, source address of the inner layer header contains the HoA or CoA of multicast source point 1, and destination address of the inner layer header contains the multicast group address, then the address information contains the source address of inner data packet and destination address of inner layer data packet. At this time, RP31 performs twice matchings, that is, determining if <source address of the inner layer header, destination address of inner layer header> matches the <HoA, G> of the same candidate multicast source point in the route forwarding table, or determining if <source address of the inner layer header, destination address of inner layer header> matches the <CoA, G> of the same candidate multicast source point in the route forwarding table. If the match is successful, eg, the source address of the inner layer header and destination address of inner layer header respectively matches the HoA3 and G3 in the same line of the route forwarding table, then step S1B further comprises, RP31 removes the outer layer header, directly using HoA3 as the source IP address and G3 as the destination IP address, and down-forwards the multicast data packet following the corresponding out-interface I4 and I5. In another case, if the source address of the inner layer header and destination address of inner layer header respectively matches the CoA3 and G3 in the same line of the route forwarding table, then step S1B further comprises, RP31 removes the outer layer header, and replaces the source address of the inner layer header from CoA3 to the corresponding HoA3 as the source IP address, takes G3 as the destination IP address, and down-forwards the multicast data packet following the corresponding out-interface I4 and I5.

In a varied embodiment, the inner layer header of the multicast data packet further contains the HoA extension option, and then the address information contains the source address of inner layer header, HoA option and destination address of inner layer header. RP31 directly performs a match using <source address of inner layer header, HoA option, destination address of inner layer header> and <CoA, HoA, G> of the same multicast source point in the route forwarding table. If the match is successful, then step S1B, further comprises: removing the outer layer header, removing the HoA option of the header, replacing the CoA of the inner layer header to the corresponding HoA as the source IP address, G as the destination IP address, and down-forwarding the multicast data packet following the corresponding out-interface.

III) multicast data packet contains three layers of IP header

When the multicast data packet received by RP31 contains three layers of IP header, that is, comprising the cases of III-a), III-b) and III-c), then in step S1A, RP31 determines that the address information contains source address of the middle layer header, source address of the innermost layer header, and destination address of the middle layer header. In that case, those skilled in the art can understand, because currently the destination address of the middle layer header and the destination address of the innermost layer header are both multicast address, the destination address of the middle layer header of the address information can be replaced as the destination address of the innermost layer header, without affecting the substance of the invention. RP31 determines whether <source address of the middle layer header, source address of the innermost layer header, destination address of middle layer header> matches the <CoA, HoA, G> of the same candidate multicast source point in the route forwarding table, that is, performing a match described before. If the match is successful, eg, the source address of the middle layer header is same to CoA1, source address of the innermost layer header is same to HoA1, and destination address of middle layer header is same to G1, then the match is successful. Then step S1B further comprises that, RP31 removes the outer layer and middle layer header, down-forwards the multicast data packet which uses the innermost layer HoA1 as the source IP address, innermost layer G1 as the destination IP address, following the corresponding multicast tree, that is, corresponding out-interface I1, I2 and I3.

Those skilled in the art should understand by combining the content disclosed by the present invention, in steps S1B, restoring the multicast data packet to the one which uses the HoA as the source address, multicast address as the destination address, and removing all the possible HoA extension option or extension header, and the possible extension option or extension header that contains the unicast address of the RP, is to keep the transparency of the movement of the mobile multicast source point with respect to each branch of the multicast group. This is because each point on the branch of shared multicast tree, including routing equipment, and the hosts joined the multicast group, are unable to perceive the mobility of the mobile multicast source point.

In the above embodiment, S12 follows S11, S1B follows the S1A, but there is no obvious order between step S11 and step S1A, that is, step S11 and S1A can be executed synchronously or asynchronously.

For example, after RP31 received the multicast data packet in step S10, it can firstly enter step S11 and step S12, determining if it is needed to forward multicast data packet to other RP of the anycast group. If it is needed to forward to other RPs, step S12 forwards it to other RPs, then enter step S1A and step S1B, searching the route forwarding table, and after finding the matched items, correspondingly down-forwarding the multicast data packet according to the corresponding shared multicast tree. Optionally, after RP31 received the multicast data packet in step S10, firstly enters step S1A and step S1B, searching the route forwarding table, after finding the matched items, correspondingly down-forwarding the multicast data packet, according to the corresponding shared multicast tree, then enters step S11 and step S12, determining if it is needed to forward multicast data packet to other RP of the anycast group, if it is needed to forward to other RPs, then in step S12, forwarding to other RPs.

In a varied embodiment, after step S10, RP31 can firstly perform step S11, step S1A, then executes step S12 and step S1B. That is, RP31 firstly execute step S1A, searching the route forwarding table, determining if the address information of the multicast data packet received matches the CoA and/or HoA and multicast address of a candidate RP point of the route forwarding table. If the match is successful, the method then enter step S11, determining if it is needed to forward multicast data packet to RP32, 33. After RP31 searching the route forwarding table, if step S1A has not found the CoA and/or HoA and multicast address matched with the address information of the multicast data packet, the method ends. That is, RP31 do not forward multicast data packet to RP32, 33. If the address information of the RP matches the <CoA, G> of the candidate RP of the route forwarding table or the address information of the RP matches the <CoA, HoA, G> of the candidate RP of the route forwarding table, then when it is determined that it is needed to forward multicast data packet to RP32, 33, RP31 can firstly restoring the multicast data packet to the multicast data packet that using the HoA as the source address, G as the destination address, then sending it to RP32 and 33.

For example, when the multicast data packet received by RP31 is corresponding to case II-a, and after RP31 searching the route forwarding table, <source address of the outer layer header, source address of the inner layer header, destination address of inner layer header> matches the <CoA2, HoA2, G> of the same candidate multicast source point in the route forwarding table, RP31 can remove the outermost layer header of the multicast data packet, only keeps the inner layer header, and encapsulates one layer of tunnel header outside the inner layer header, and the source address of the outer tunnel header is the unicast address of RP31, destination address is the unicast address of RP32, and sends it to RP32; or P31 does not remove the outer layer header, directly encapsulates one layer of tunnel header outside the outer layer header, the source address of the outermost tunnel header is the unicast address of RP31, destination address is the unicast address of RP32, and sends it to RP32. Similarly, P31 removes or does not remove the outer layer header, and encapsulates the unicast tunnel headers from RP31 to RP33, and sends it to RP33 in the unicast tunnel way. It is worth noting that, although corresponding out-interface list corresponded to the candidate multicast data packet that corresponded to the <CoA2, HoA2, G2> of RP31 is empty, representing that the branches in RP31 corresponding to shared multicast tree G2 that uses HoA1 as the source and RP31 as the root point, do not comprises the multicast members that joined multicast group G2, but since the route forwarding table of RP31 has the option, representing that <CoA2, HoA2, G2> is legal, therefore, out-interfaces list is empty does not affect RP31 forwarding the data packet to RP32 and 33 in anycast group 5. Each RP locally maintains the out-interface list respectively, therefore, the out-interface list of the route forwarding table of each RP is different. Although on RP31, the out-interface corresponded to <CoA2, HoA2, G2> is empty, the out-interface corresponded to <CoA2, HoA2, G2> on RP32 or 33 may not be empty. In another embodiment, for example, in step S10, the multicast data packet received by RP31 only contains one layer of header, and in step S1A, when RP31 searching the route forwarding table, and find that <source address of header, destination address of header> matches <CoA3, G3> of the same candidate multicast source point, then the method enters step S11 to determine if it is needed to forward the multicast data packet to other RP. Since the multicast data packet only contains one layer of data header, and the source address of the header is CoA3, it is apparently needed to forward the multicast data packet to other RPs. In step S12, RP31 can modify the source address of the header to HoA3, and keep destination address G3 unchanged, and attaches the unicast tunnel header, with the source address as the RP31 and destination address as the unicast address of other RP32 or 33, outside the header. It is worth noting that, RP31 can both firstly change the source address, then attaches the outer tunnel header, and firstly attaches the outer tunnel header, then modify the source address of inner layer header.

In addition, for the case that the header of multicast data packet received by RP31 contains HoA option, in step S12, RP31 can choose to remove the HoA option, then forwards it to other RPs; or keeps the HoA option, and directly forwards to other RPs.

Those skilled in the art should understand, according to different case of the data packet received, when RP31 needs to forward the multicast data packet to other RPs, RP31 can use different sending ways to forward the multicast data packet, and it is not limited to the three examples given above.

In each embodiment above, when RP31 needs to forward multicast data packets to other RPs, RP31 uses the unicast tunnel way to forward multicast data packet to other RPs. In a varied embodiment, in order to enable other RPs to obtain the multicast data packet, RP31 can add the routing extension header (for IPv6 case) or add source routing options (for IPv4 case) in the data packet received. And since they are similar as the above solutions in this article, unnecessary description will not be given.

Above, specific description of the present invention is set forth on the traffic data level, and the following describes another specific embodiment of the present invention from the perspective of control signaling.

In the above article, it is mentioned that the RP31 down-forwards multicast data packets, depending on the search result of the route forwarding table. The following will specifically describes how RP31 and other RPs in the same anycast group 5 synchronously update the route forwarding table, according to one embodiment of present invention.

When any of the following conditions are met, RP31 and other RPs in the same anycast group 5 shares the related information of the route forwarding table, the related information comprises the updated items, etc.

i) When RP31 updates the route forwarding table, RP31 will send the updated items of the route forwarding table to all the other RPs of anycast group 5.

The updating comprises adding, deleting, or changing. For example, when mobile multicast source point moves to a new sub-net, and obtains a new CoA, the mobile multicast source point registers to the RP in new sub-net. Mobile multicast source point can directly register to RP, or the designated router 2 of the mobile multicast source point acts as the agent of multicast source point 1 to register. For example, multicast source point 1 sends the register information to the anycast address of anycast group 5, and the anycast address is similar to the unicast address. The register information contains the HoA and current CoA of the mobile multicast source, eg: <HoA4, CoA4>, in addition, further contains the life cycle of CoA4. When the anycast member of the anycast group, preferably, the nearest RP31 received the register information, for example, if the local stored route forwarding table of RP31 only contains <HoA4, G4>, but not the corresponding CoA, or the CoA is already expired, then RP31 updates the corresponding item to <CoA4, HoA4, G4>. The updating method mentioned above represents the multicast source point is not the new-generated multicast source point, but just the point, which sends the multicast data packet by using the HoA4 as the multicast source point, that has moved. Then the multicast data packet coming from the CoA4 and using G as the destination address can reuse the shared multicast tree established for <HoA4, G4>, without re-establishing a shared multicast tree.

In another example, if RP31 has not found in the local stored route forwarding table the item with the same HoA address of the register packet received, RP31 knows the multicast source point is a new emerged multicast source point, RP31 creates the <HoA5, CoA5> item, and RP31 needs to establish the shared multicast tree for the multicast source point represented by <HoA5, CoA5>. Since the establishment of the shared multicast tree has little relationship with the present invention, unnecessary description will not be given.

Or, the route forwarding table of RP31 contains the life cycle of CoA, when RP31 discovers the aging time of the timer of the CoA expires, and no new registration message to update the time of aging timer, RP31 deletes the corresponding item.

Then, RP31 sends the updating information of the route forwarding table to all the other RPs of anycast group 5. The updating comprises the adding, deleting or modifying described above. RP31 can use various ways to send the protocol packet, for example, using IP unicast mode, namely both the UDP mode and the TCP mode, or multicasting, even using a P2P way, as long as it can send messages to every anycast member of anycast group 5 one by one.

ii) RP31 periodically sends the related information of the route forwarding table to other RPs of anycast group 5, and after last time sending the related information of the route forwarding table to other RPs, elapsed time has already reached the scheduled time period.

iii) RP31 receives the request from other RPs of anycast group 5:

For example, RP31 receives the request that wishes to obtain the route forwarding table related information from RP32. Then, correspondingly, RP31 sends the route forwarding table related information to RP32.

Of course, RP31 can receive the route forwarding table related information from RP32 or 33, then RP31 updating the local route forwarding table, according to the route forwarding table related information from RP32 or 33.

Generally, each RP of anycast group 5 firstly shares the route forwarding table related information, then forwards data packet to other RPs of anycast group 5. Otherwise, even if the data packet is received by other RPs, it would be dropped by the RP, since there is no corresponding item in the route forwarding table of the RP.

The method of present invention further comprises, adding the anycast address of anycast group 5 into the unicast routing system of the domain, that is, using the anycast address as the path of unicast routing.

The following will simply describe the technical effect of present invention.

Shown as FIG. 1, if RP31 is out of order, since RP31, 32 and 33 composes an anycast group and share a same anycast group address, automatic convergence to this anycast address is done via unicast routing. That is, the mobile source register protocol packet and multicast data packet from mobile multicast source point 1, routed by RP31 before RP31 is out of order, are routed to other RPs of the anycast group 5 expect RP31 which is out of order, for example RP32. Since all the RPs of anycast group 5 share the route forwarding table, and take the down forwarding task of the multicast data packet commonly, that is, there are parts of hosts of the same multicast group under each of the RP, that is multicast group member, the receiver of the multicast traffic. All the receivers of a multicast group can be covered, through all the RPs of anycast group 5. Therefore, it can be implemented the load-sharing and preventing single-point failure between each RP of the anycast group.

For the receiver of the multicast traffic from mobile multicast point 1, if RP 31 is out of order, the unicast route that uses the anycast address as the destination address in the domain re-converges, that is, each receiver joining in the multicast group G controlled by the RP that has fault, automatically connects other shared multicast tree of the multicast group G that using other RP of anycast group 5 as the root, by multicast route protocol, eg PIM-SM protocol. Therefore, the multicast traffic of each receiver which joins in the multicast group G, and is originally controlled by RP31 which is out of order, can be re-covered, and the receivers controlled by other normally working RPs are not effected by the RP31 failure.

Figure 8:
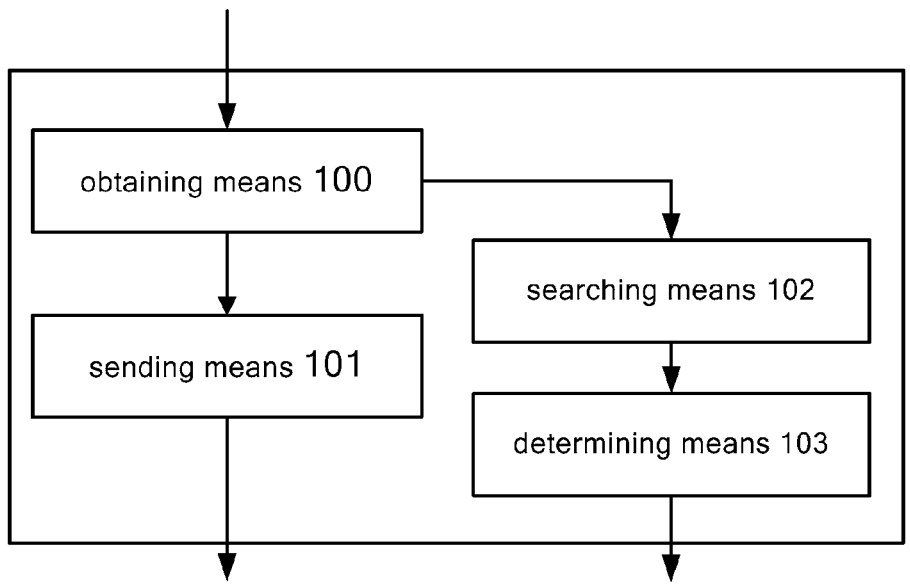
FIG. 8 is the equipment block diagram according to an embodiment of the invention.

Above each embodiment specifically describes the present invention from the perspective of method flow, and the following will simply describes the present invention from the perspective of device. FIG. 8 is the equipment block diagram, according to an embodiment of the invention. Processing device 10 shown in FIG. 8 is in RP31 shown in FIG. 2. Of course, RP32 and 33 shown in FIG. 2 also comprise the processing device 10 shown in FIG. 8. Since the operation performed by processing device 10 in each different RP is totally similar, so, for easy illustration, processing device 10 of RP31 is taken as example to illustrate the present invention. Shown as FIG. 8, processing device 10 comprises obtaining means 100, sending means 101, searching means 102, and determining means 103.

Firstly, obtaining means 100 obtains the multicast data packet. The sending mode of the multicast data packet (eg. encapsulation format) are shown in FIG. 3, FIG. 4 and FIG. 5A-5C.

Afterwards, RP31 determines if it is needed to forward the multicast data packet to the second RP32 and 33, according to the multicast data packet obtained by RP31. When the source address of the outermost layer header of the multicast data packet does not contain the unicast address of the second RP32 or 33, then it determines that it is needed to forward the multicast data packet to the second RP32 and 33, then sending means 101 forwards the multicast data packet to the second RP32 and 33.

In a varied embodiment, when RP31 determines that the source address of the outermost layer header of the multicast data packet does not contain the unicast address of the second RP32 or 33, and searching means 102 already found the CoA and/or HoA and multicast address of the candidate multicast source point which match the address information of the multicast data packet in the route forwarding table, then RP31 determines it is needed to forward the multicast data packet to the second RP32 and 33, afterwards, sending means 101 forwards the multicast data packet to the second RP 32 and 33.

In addition, processing device 10 further comprises searching means 102, used for searching the mentioned route forwarding table, according to the address information of the multicast packet obtained;

Of course, the content of the address information is different, according to different sending mode of the multicast data packet.

Figure 3:
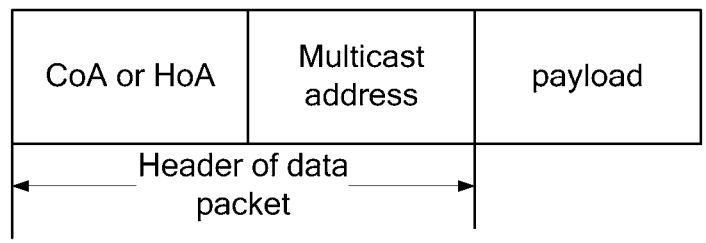
FIG. 3 is the diagram of encapsulation format of multicast data packets, according to an embodiment of the invention.
Figure 6B:
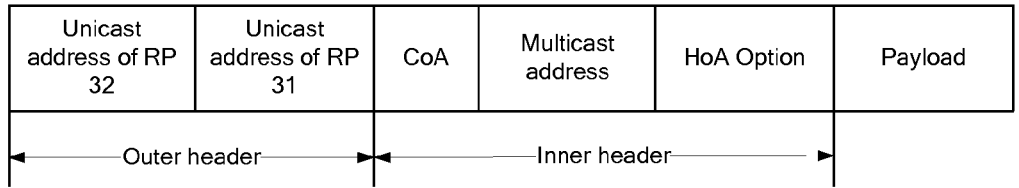
FIG. 6B corresponds to a diagram of one varied embodiment of the encapsulation format of multicast data packets in FIG. 5C.

- when the multicast data packet only has one layer of header, the address information used for matching the route forwarding table contains the source address and destination address of the header, shown as FIG. 3;
- when the multicast data packet only has one layer of header, and the header further contains the HoA of the extension option, the address information contains the source address, destination address and the HoA of the extension of the mentioned header, shown as FIG. 4;
- when the multicast data packet has two layers of header, the address information contains the source address of the outermost layer header and/or source address of the innermost layer header, address information further comprises the destination address of the innermost layer header, referring to FIG. 5A, 5B or 5C;
- when the multicast data packet has two layers of header, and the mentioned header further contains the HoA of the extension option, the mentioned address information contains the source address of the outermost layer header and/or source address of the innermost layer header, and the address information further comprises the destination address of the innermost layer header, referring to FIG. 6A or 6B;
- when the multicast data packet has three layers of header, the address information contains the source address and destination address of the middle layer header and source address of the innermost layer header, referring to FIG. 7A, 7B or 7C;

Therefore, when the encapsulation format of the data packet obtained by obtaining means 100 is different, source address, destination address of each layer of data header is different, the address information selected by searching means 102 is different when it is doing the search, specific selection rules have been given in the above description of the methods section of present invention, and they are not repeated here.

Then, determining means 103 judges according to the search result of the searching means 102, when the address information of multicast data packet matches the CoA and/or HoA and multicast address of one candidate multicast source of one or more multicasts of the route forwarding table stored by RP31, determining means 103 determines the corresponding multicast tree, and forwards the multicast data packet, according to the mentioned shared multicast tree.

For different encapsulation format of the data packet, the operation executed by determining means 103 in down-forwarding the multicast data packet is also different. For example, when the address information of the multicast data packet at least matches the CoA and group address of candidate RP, determining means 103 further comprises restoring means (not shown in FIG. 8), used for restoring the multicast data packet to a multicast data packet which uses the HoA of the candidate multicast source as the source address, the group address as the destination address; determining means 103 is further used for, determining the shared multicast tree with the candidate multicast source point as multicast source, the HoA as the source address and the multicast address as the destination address, and forwarding the mentioned restored multicast data packet, according to the determined shared multicast tree. Those skilled in the art can understand that, the operation of the restored multicast data packet, according to the shared multicast tree, can also be done by sending means 101.

In a varied embodiment, when it is needed to forward the multicast data packet to the second RP, sending means 101 is further used for, forwarding the multicast data packet that is restored by the restoring means to the second RP32 and 33, wherein the restored multicast data packet uses the HoA of the candidate multicast source as the multicast source point and the multicast address as the destination address.

In a varied embodiment, when the address information selected by searching means 102 during the searching further contains the HoA of the extension option or extension header, searching means 102 found, through searching the route forwarding table, that the HoA of the extension option or extension header matches the HoA of the candidate multicast source and other address information matched the CoA, multicast address of the candidate multicast source, then the restoring means of determining means 103 is further used for removing the HoA of the extension option or extension header.

In addition, for those only has one layer of header, and the <source address, destination address> of the header matches the <CoA, G> of one candidate multicast source point of the route forwarding table, restoring means is further used for: modifying the source address of the multicast data packet to the HoA of the candidate multicast source point.

For the multicast data packet that at least has two layers of data headers, restoring means is further used for removing all the outer header, only keeping the innermost header. And when the innermost layer header matches the <CoA, G> of one candidate multicast source point of the route forwarding table, restoring means is further used for modifying the source address of the innermost layer header to the HoA of the candidate multicast source point.

The embodiment of each device mentioned above is based on the information of the pre-stored route forwarding table in each RP. In a varied embodiment, processing device further comprises the sharing means (not shown in FIG. 8), used for sending the related information of the route forwarding table to the second RP for each second rendezvous point to update the respective route forwarding table, when a predetermined condition is met.

The predetermined condition comprises any of the following:

i) When RP31 updates the route forwarding table, sharing means sends the updated item of the route forwarding table to all the other RP of anycast group 5. The updating comprises adding, deleting or changing. For example, RP 31 receives the registration information from the mentioned multicast source point, the registration information comprises the corresponding relation of CoA and HoA of the mentioned multicast source point, and RP31 updates the locally stored corresponding relationship between the HoA and CoA. Then sharing means needs to send the updated content to all the second RPs of anycast group 5.

ii) ii) RP 31 periodically sends the related information to other RPs of anycast group 5, and after the last time RP previously sent the related information of the route forwarding table to other RP point, the elapsed time has reached a predetermined time period, then the sharing means needs to send the related information of the route forwarding table, for example, some item of the route forwarding table.

iii) RP31 receives the request from other RP of anycast group 5, then sharing means sends the related information of the route forwarding table to the RP that queries.

Above described the embodiment of the present invention, the present invention is not limited to specific system, device and protocol, those skilled in the art is able to make various variation or modification within the scope of right claimed in appendix.

What is claimed is:

1. A method, used for processing multicast data packets from mobile multicast source point, in a first rendezvous point of communication network, wherein, the first rendezvous point and at least one second rendezvous point compose an anycast group which is used for sharing the processing task of the multicast data packets of the mobile multicast source point together, the first rendezvous point comprising a unicast address of each of the at least one second rendezvous point, the first rendezvous point and the at least one second rendezvous point share a route forwarding table, the route forwarding table comprise corresponding relation among the care-of-address, the home address and the multicast address of one or more multicast sources, the method comprises:
    obtaining the multicast data packets;
    forwarding the multicast data packets to the at least one second rendezvous point when a source address of a header of an outermost layer of the multicast data packets does not include the unicast address of any of the at least one second rendezvous point;
and after the obtaining the method further comprises,
    searching the route forwarding table, according to address information of the multicast packet;
    determining the corresponding shared multicast tree, when the address information matches the care-of address and/or home address and matches the multicast address of an candidate multicast source in the one or more multicast sources, and forwarding the multicast data packet according to the shared multicast tree.

2. The method according to claim 1, wherein the determining further comprises:
    restoring the multicast data packet to a multicast data packet which uses the home address of the candidate multicast source as the multicast source point, when the address information matches at least the care-of address and multicast address of the candidate multicast source;
    determining the shared multicast tree which has the home address as the source address and the multicast address as the destination address, and forwarding the restored multicast data packet according the determined shared multicast tree.

3. The method according to claim 2, wherein prior to the forwarding the method comprises the restoring, the forwarding further comprises:
    forwarding the restored multicast data packet to at least one second rendezvous point, when the IP source address of the header of the outermost layer of the multicast data packet does not comprise the unicast address of any of the at least one second rendezvous point and the address information matches with the care-of address and multicast address of the candidate multicast source.

4. The method according to claim 2, wherein the address information further comprise the home address of the extension, and the home address of the extension matches the home address of the candidate multicast source, the restoring further comprises:
    when the address information matches the care-of address, multicast address and home address of the candidate multicast source, the sub-step of restoring the multicast data packet as the multicast data packet which uses the home address of the candidate multicast source as the multicast source point further comprises:
    removing the home address of the extensions.

5. The method according to claim 2, wherein the multicast data packet comprises one layer of IP header, the sub-step of restoring the multicast data packet as the multicast data packet which uses the home address of the candidate multicast source further comprises:
    modifying the source address of the multicast data packet to the home address of the candidate multicast source.

6. The method according to claim 2, wherein the multicast data packet comprises at least two layers of IP headers, the sub-step of restoring the multicast data packet as the multicast data packet which uses the home address of the candidate multicast source further comprises:
    removing all of the outer IP headers of the multicast data packet.

7. The method according to claim 6, wherein the sub-step of restoring the multicast data packet as the multicast data packet which uses the home address of the candidate multicast source further comprises:
    modifying the source address of the innermost IP header to the home address of the candidate multicast source.

8. The method according to claim 1, wherein prior to the obtaining the method further comprises:
    sending the related information of the route forwarding table to the at least one second rendezvous point, for each second rendezvous point to update the respective route forwarding table, when a predetermined condition is met.

9. The method according to claim 8, wherein prior to the sending, the method further comprises:
    receiving the register information from the multicast source point, the register information comprises the care-of address and home address of the multicast source point;
    the predetermined condition includes updating the route forwarding table, according to the care-of address and home address of the multicast point.

10. The method according to claim 8, wherein the first rendezvous point periodically sends the related information of the route forwarding table to the at least one second rendezvous point;
    the predetermined condition includes after the first rendezvous point previously sent the related information of the route forwarding table to at least one second rendezvous point, the elapsed time has reached a predetermined time period.

11. The method according to claim 8, wherein the predetermined condition further comprises:
    the first rendezvous point obtains the request information from the at least one second rendezvous point, wherein, the request information is used for requesting the first rendezvous point to send the related information of the route forwarding table to the at least one second rendezvous point.

12. The method according to claim 1, wherein prior to the obtaining, the method further comprises:
    updating the route forwarding table, according to the related information of the route forwarding table from the at least one second rendezvous point.

13. The method according to claim 1, wherein the address information comprises any of the following:
    the address information comprises the source address and destination address of the header, when the multicast data packet only has one layer of header;
    the address information comprises the source address, destination address of the header and the home address of the extension, when the multicast data packet only has one layer of header, and the header further comprises the home address of the extension;

the address information comprises the source address of the header of the outermost layer and/or the source address of a header of an innermost layer, the address information further comprises the destination address of the innermost layer data packet, when the multicast data packet comprises two layers of header;

the address information comprises the source address of the header of the outermost layer and/or the source address of the header of the innermost layer, the address information further comprises the destination address of the innermost layer data packet, when the multicast data packet has two layers of header, and the header further comprises the home address of the extension;

the address information comprises the source address and destination address of a header of a middle layer and the source address of the header of the innermost layer, when the multicast data packet has three layers of header.

14. A processing device, used for processing the multicast data packets from mobile multicast source point, in the first rendezvous point of communication network, wherein, the first rendezvous point and at least one second rendezvous point compose an anycast group which is used for sharing the processing task of the multicast data packets of the mobile multicast source point together, the first rendezvous point comprising a unicast address of each of the at least one second rendezvous point, the first rendezvous point and the at least one second rendezvous point share a route forwarding table, the route forwarding table comprise corresponding relation among care-of-address, the home address and the multicast address of one or more multicast sources, the device comprising:

an obtaining means configured to get the multicast data packet;

a sending means configured to forward the multicast data packet to the at least one second rendezvous point when a source address of a header of an outermost layer of the multicast data packets does not include the unicast address of any of the at least one second rendezvous point.

* * * * *